US008553499B2

(12) United States Patent
Albertin et al.

(10) Patent No.: US 8,553,499 B2
(45) Date of Patent: Oct. 8, 2013

(54) MIGRATION-BASED ILLUMINATION DETERMINATION FOR AVA RISK ASSESSMENT

(75) Inventors: Uwe Albertin, Houston, TX (US); Ole Joran Askim, Trondheim (NO); Mariana Gherasim, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 450 days.

(21) Appl. No.: 12/897,431

(22) Filed: Oct. 4, 2010

(65) Prior Publication Data

US 2011/0103187 A1 May 5, 2011

Related U.S. Application Data (60) Provisional application No. 61/248,222, filed on Oct. 2, 2009.

(51) Int. Cl.
*G01V 1/30* (2006.01)
(52) U.S. Cl.
USPC .................................. 367/73; 367/38; 702/14
(58) Field of Classification Search
USPC ........................... 367/38, 63, 73; 702/14, 16
See application file for complete search history.

(56) References Cited

U.S. PATENT DOCUMENTS

| 4,646,239 | A | | 2/1987 | Bodine et al. | |
|---|---|---|---|---|---|
| 5,838,634 | A | * | 11/1998 | Jones et al. | 367/73 |
| 7,280,918 | B2 | * | 10/2007 | Williams | 702/14 |
| 2004/0230379 | A1 | * | 11/2004 | Houck | 702/14 |

FOREIGN PATENT DOCUMENTS

WO  2005/008292 A1  1/2005

OTHER PUBLICATIONS

Ozdogan Yilmaz, "Seismic Data Processing", Society of Exploration of Geophysicists, 1987, Chapter 1, pp. 9-80, Tulsa, Oklahoma, USA.
Ozdogan Yilmaz, "Seismic Data Processing", Society of Exploration of Geophysicists, 1987, Chapter 6, pp. 384-427, Tulsa, Oklahoma, USA.
PCT International Search Report and Written Opinion of the International Searching Authority issued in related application No. PCT/US2010/051321, mailed Feb. 22, 2011, 14 pages
Guy Chavent and Rene-Edouard Plessix, "An Optimal True-Amplitude Least Squares Prestack Depth-Migration Operator", Geophysics, XP-002621553, vol. 64, No. 2, Mar.-Apr. 1999, pp. 508-515.
Xiao-Bi Xie, Shengwen Jin, and Ru-Shan Wu, "Wave-equation-based Seismic Illumination Analysis", Geophysics, XP-002621554, vol. 71, No. 5, Sep.-Oct. 2006, pp. S169-S177.

(Continued)

Primary Examiner — Ian Lobo
(74) Attorney, Agent, or Firm — Gunnar Heinisch (57) ABSTRACT

According to a preferred aspect of the instant invention, there is provided herein a system and method for extending zero-offset or stacked wave-equation illumination analysis into the angle-gather domain, where it becomes an appropriate tool for assessing the effects of complex overburden on AVA response. A preferred method for doing this involves first creating an angle gather that has a perfect AVA response (i.e. a constant amplitude as a function of angle). This gather is then preferably used as a reflectivity map that is fed into a demigration process which creates modeled data that by construction carries with it a completely flat reflectivity signature. Remigration of such a data set then results in a gather on which any amplitude variation is more likely to be a measure of illumination effects alone. The resulting AVA signature on the gather can then be used to assess the validity of the AVA response on modeled or actual data, resulting in a useful AVA risk analysis.

7 Claims, 5 Drawing Sheets

(56) References Cited

OTHER PUBLICATIONS

James E. Rickett, "Illumination-based Normalization for Wave-equation Depth Migration", Geophysics, XP-002621555, vol. 68, No. 4, Jul.-Aug. 2003, pp. 1371-1379.

John P. Castagna, University of Oklahoma, Norman, Oklahoma, and Herbert W. Swan, ARCO Exploration and Production Technology, Plano, Texas, "Principles of AVO Crossplotting", The Leading Edge, Apr. 1997, pp. 337-342.

* cited by examiner

INSERT POINT DIFFRACTOR
INTO SUBSURFACE 'IMAGE'

Figure 6B

DEMIGRATE SPIKE TO SURFACE
TO PRODUCE 'MODELED' DATA
(USE ADJOINT OF MIGRATION)

Figure 6C

REMIGRATE DATA BACK INTO
THE SUBSURFACE

MIGRATION-BASED ILLUMINATION DETERMINATION FOR AVA RISK ASSESSMENT

RELATED CASE

This application claims the benefit of U.S. Provisional Patent Application Ser. No. 61/248,222 filed on Oct. 2, 2009, and incorporates said provisional application by reference into this disclosure as if fully set out at this point.

TECHNICAL FIELD

This invention relates to the general subject of seismic exploration and, in particular, to methods for estimating seismic and other signals that are representative of the subsurface in areas of complex subsurface structure.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a discrete sampling of the reflected acoustic wavefield in time. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be taken extracted from a stacked or unstacked seismic volume by collecting all of the digital samples that reflect from a given subsurface location after correcting these samples for the effects of acoustic propagation. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2D seismic line from within the 3D data volume. It should also be noted that a 3D dataset can be thought of as being made up of a 5D data set that has been reduced in dimensionality by stacking it into a 3D image. The dimensions are typically time (or depth "z"), "x" (e.g., North-South), "y" (e.g., East-West), source-receiver offset in the x direction, and source-receiver offset in the y direction. While the examples here may focus on the 2D and 3D cases, the extension of the process to four or five dimensions is straightforward.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

Many variations of the conventional source-receiver arrangement are used in practice, e.g. VSP (vertical seismic profile) surveys, ocean bottom surveys, etc.

Seismic attributes such as amplitude versus offset ("AVO") or amplitude versus angle of incidence ("AVA") analyses can yield important information about the contents of subsurface rock formations. Although hydrocarbons cannot generally be viewed directly in the subsurface using seismic, variations in reflectivity with angle of incidence have been increasingly used as an attribute or indicator of the presence of subsurface gas. See, for example, Castagna and Swan, "*Principles of AVO Crossplotting*", *The Leading Edge*, April 1997, the disclosure of which is incorporated herein by reference. However, deeper targets pose a number of problems for this technology, not the least of which is related to the distortion that may be introduced by the subsurface structure and/or the processing methods that are used to image that structure.

One of the key aspects in the continuing development of these areas of complex geology is well planning, which often must be done in geologic settings where obtaining good seismic images can be a challenge. Since AVA is often used to assess the potential for well location, any irregularities in AVA response due to uneven acoustic illumination resulting from complex overburden introduces substantial risk in AVA analysis and could very well adversely effect well placement.

Subsurface imaging in regions of complex structure is problematic because the seismic wavefield may be distorted significantly as it passes through such complexity. Of particular interest for purpose of the instant disclosure is imaging in the presence of subsurface salt. Seismic surveys that include subsurface salt features (e.g., salt domes) can produce data that is marred by uneven illumination of the reflectors below the salt (or other structure). This in turn, can cause AVA-type analyses to be difficult to interpret and/or simply unreliable. In the case of a salt dome, the distortion in the wavefield is caused by the large velocity contrast between salt and the surrounding rock (i.e., salt typically has a seismic velocity that is much higher than that of the surrounding sedimentary rocks). This velocity contrast results in large amounts of ray bending and rays that are normal to the target reflector will tend to go critical at the sediment salt interface. Conventional seismic imaging methods do not properly compensate for this uneven illumination, which can distort the observed trace amplitudes and can render AVO/AVA analysis unreliable.

Thus, what is needed is a method of compensating seismic gathers for illumination irregularities caused by structure, the effects of the acquisition footprint, and wave propagation effects in complex structural areas while simultaneously preserving the AVA reflectivity signature.

Heretofore, as is well known in the seismic processing and seismic interpretation arts, there has been a need for a method of obtaining better estimates of the AVA effect in areas with a complex geological subsurface structure. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided herein a system and method for extending zero-offset or stacked wave-equation illumination analysis into the angle-gather domain, where it becomes an effective tool for assessing the effects of complex overburden on AVA response. A preferred method for doing this involves first creating an angle gather (see, e.g., U.S. Pat. No. 4,646,239, the disclosure of which is incorporated by reference) that has a perfect AVA response (i.e., a constant amplitude as a function of angle).

This gather is then preferably used as a reflectivity map that is used in a demigration or modeling process the output from which is modeled data that, by construction, carries with it a completely flat reflectivity signature. "Demigration" is a process by which a depth migrated data set is used to calculate an estimate of an original common-offset section from which it could have been obtained. Note that for purposes of the instant disclosure, the terms "modeling" and "unit reflector modeling" should be understood to be a process by which a synthetic seismic data set is produced from a model of the earth carries a flat reflectivity signature (i.e., one in which there is no variation in reflection amplitude with changing angle of incidence).

Note that this definition should be broadly construed to include the sort of unit amplitude reflector discussed above, as well as model are generated that where density reflectors are used in acoustic two-way time modeling.

Those of ordinary skill in the art will recognize that the adjoint of the migration operator can be defined as demigration. Of course, the demigration operation can be used to convert a depth migrated section to a time domain data set that approximates the original acquired data.

Thus, remigration of a demigrated or modeled data set produced according to the instant invention then produces a gather on which any amplitude variation is more likely to be a measure of illumination effects alone. The resulting AVA signature on the gather can then be used to help distinguish whether amplitude variation on the angle gathers is due to illumination effects during propagation, or actual rock properties. This approach also preferably produces an AVA confidence analysis which can help the explorationist determine when AVA signatures are relatively free from illumination effects.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

Figure 1:
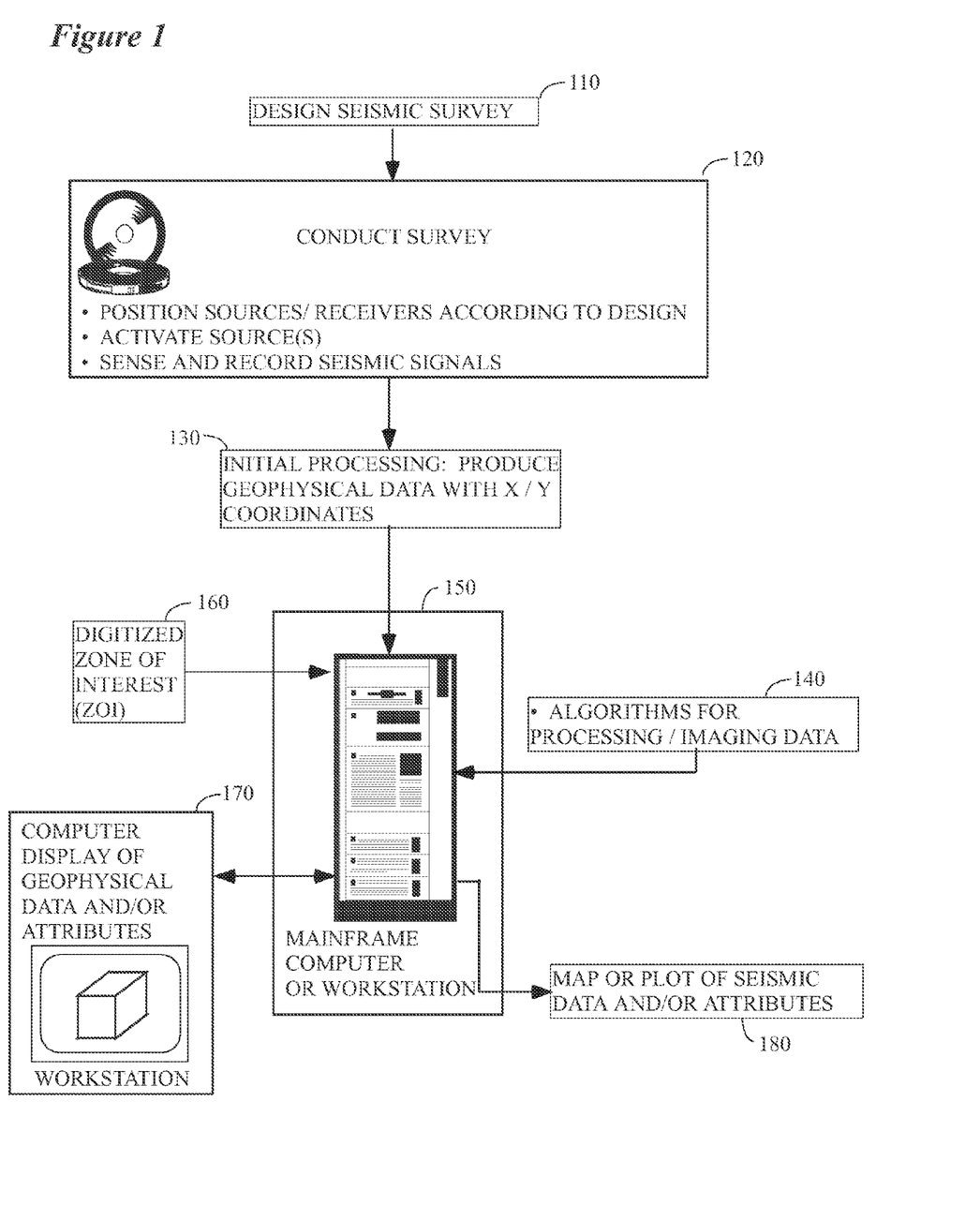
FIG. 1 illustrates the general environment of the instant invention.

FIG. 1 illustrates the general environment in which the instant invention would typically be used. A seismic survey is designed 110 by the explorationist to cover an area of economic interest. Field acquisition parameters (e.g., shot spacing, line spacing, fold, etc.) are typically selected in conjunction with this step, although it is common to modify the ideal design parameters slightly (or substantially) in the field to accommodate the realities of conducting the survey.

Seismic data are collected in the field 120 over a subsurface target of potential economic importance and are typically sent thereafter to a processing center 150 where they will be processed for use in exploration. In some cases, there may be some initial data processing performed in the field and this is becoming more common and feasible given the computing power that is available to field crews.

In the processing center a variety of preparatory processes 130 are applied to the seismic traces to make them ready for use by the methods disclosed hereinafter. The processed traces would then be made available for use by the instant invention and might be stored, by way of example only, on hard disk, magnetic tape, magneto-optical disk, DVD disk, or other mass storage means.

The methods disclosed herein would best be implemented in the form of a computer program 140 that has been loaded onto a general purpose programmable computer 150 where it is accessible by a seismic interpreter or processor. Note that a general purpose computer 150 would typically include, in addition to mainframes and workstations, computers that provide for parallel and massively parallel computations, wherein the computational load is distributed between two or more processors. As is also illustrated in FIG. 1, in the preferred arrangement some sort of digitized zone of interest model 160 may be specified by the user and provided as input to the processing computer program. In the case of a 3D seismic section, the zone of interest model 160 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those skilled in the art will recognize that this might be done any number of ways.

A program 140 embodying the instant invention might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. In a typical seismic processing environment, the methods of the instant invention would be made part of a larger package of software modules that is designed to perform many of the processing steps listed in FIG. 2. After processing by the instant methods, the resulting traces would then typically be sorted into gathers, stacked, and displayed either at a high resolution color computer monitor 170 or in hard-copy form as a printed seismic section or a map 180. The seismic interpreter would then use the displayed images to assist him or her in identifying subsurface features conducive to the generation, migration, or accumulation of hydrocarbons.

Figure 2:
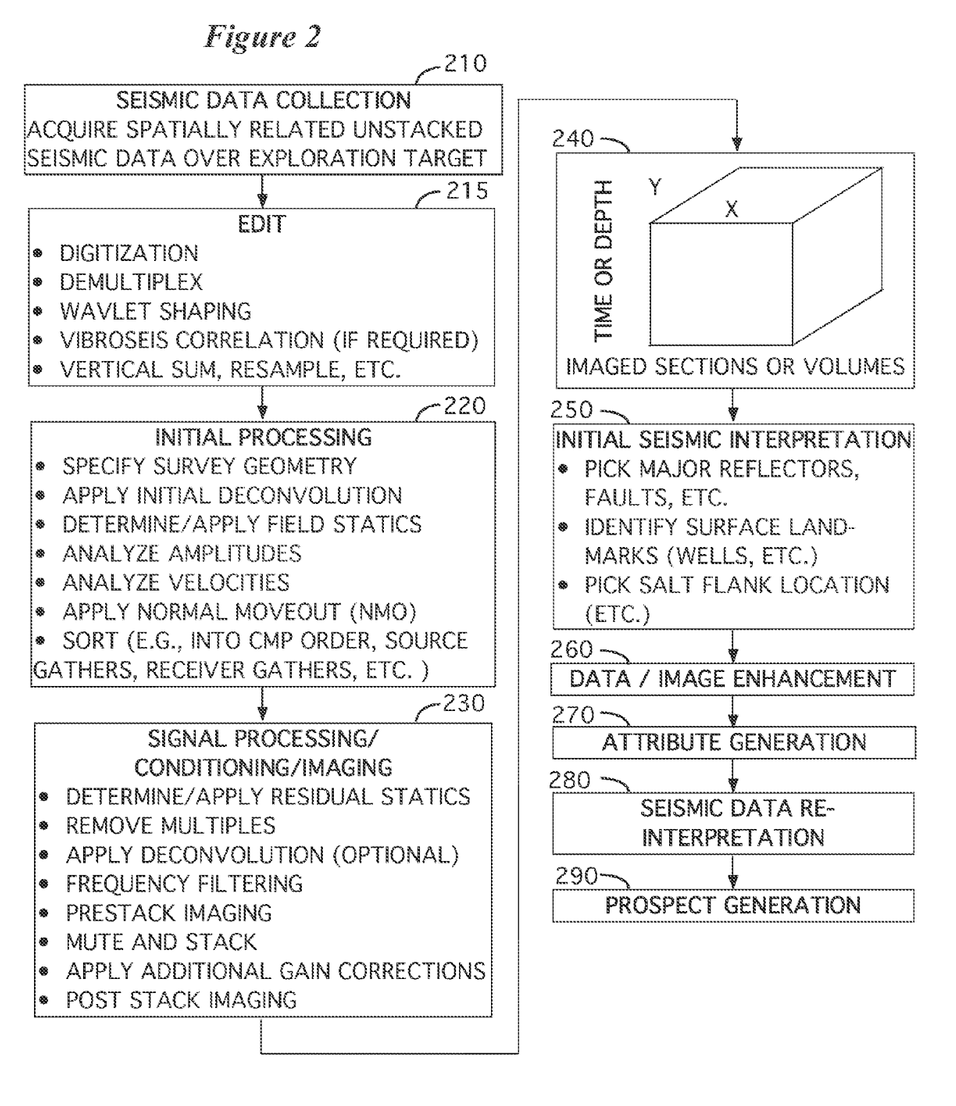
FIG. 2 illustrates a seismic processing sequence suitable for use with the instant invention.

As was indicated previously, the instant invention will preferably be made a part of and incorporated into a conventional seismic processing sequence of the sort generally described in FIG. 2. Those of ordinary skill in the art will recognize that the processing steps illustrated in FIG. 2 are only broadly representative of the sorts of processes that might be applied to such data and the choice and order of the processing steps, and the particular algorithms involved, may vary markedly depending on the individual seismic processor, the signal source (dynamite, vibrator, etc.), the survey location (land, sea, etc.) of the data, the company that processes the data, etc.

As a first step, and as is generally illustrated in FIG. 2, a 2D or 3D seismic survey is conducted over a particular volume of the earth's subsurface (step 210). The data collected in the field consist of unstacked (i.e., unsummed) seismic traces which contain digital information representative of the volume of the earth lying beneath the survey. Methods by which such data are obtained and processed into a form suitable for use by seismic processors and interpreters are well known to those of ordinary skill in the art.

The purpose of a seismic survey is to acquire a collection of spatially related seismic traces over a subsurface target of some potential economic importance. Data that are suitable for analysis by the methods disclosed herein might consist of, for purposes of illustration only, an unstacked 2-D seismic line, an unstacked 2-D seismic line extracted from a 3D seismic survey or, preferably, an unstacked 3D portion of a 3D seismic survey, or a 4D or 5D survey, etc. The invention disclosed herein is most effective when applied to a group of seismic traces that have an underlying spatial relationship with respect to some subsurface geological feature. Again for purposes of illustration only, the discussion that follows will be couched in terms of traces contained within a 3-D survey (stacked or unstacked as the discussion warrants), although any assembled group of spatially related seismic traces could conceivably be used.

After the seismic data are acquired (step 210), they are typically taken to a processing center where some initial or preparatory processing steps are applied to them. As is illustrated in FIG. 2, a common early step 215 is designed to edit the input seismic data in preparation for subsequent processing (e.g., demux, gain recovery, wavelet shaping, bad trace removal, etc.). This might be followed by specification of the geometry of the survey (step 220) and storing of a shot/ receiver number and a surface location as part of each seismic trace header. Once the geometry has been specified, it is customary to perform a velocity analysis consisting of NMO analysis if the processing is time processing, or NMO followed by RMS to interval velocity conversion followed by depth migration and tomography to obtain an initial velocity model for depth migration.

After the initial pre-stack processing is completed, it is customary to condition the seismic signal on the unstacked seismic traces before creating stacked (or summed) data volumes (step 230). In FIG. 2 step 230 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a seismic volume or, in the case of 2D data, a seismic line for use in the exploration for hydrocarbons within the subsurface of the earth.

In some preferred arrangements, the instant invention might best be utilized in connection with step 230. That being said, those of ordinary skill in the art will recognize that there are many other points in a typical processing sequence that could be improved through the use of the instant invention.

As is further suggested in FIG. 2, any digital sample within a seismic volume is uniquely identified by a (X,Y, OFFSETX, OFFSETY, TIME) vector, with the X and Y coordinates representing some position on the surface of the earth, the OFFSETX and OFFSETY coordinates specifying the distance between source and receiver, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques. In addition, depending on whether the volume is imaged or unimaged, a sample in the volume may be determined by surface offset (i.e. OFFSETX and OFFSETY) if the volume is unimaged or imaged in the form of offset gathers, or alternatively by reflection opening angle and azimuth, if the volume is imaged in the form of angle-gathers.

After stacking of an image volume, the explorationist may do an initial interpretation 250 of the resulting stacked volume, wherein he or she locates and identifies the principal reflectors and faults wherever they occur in the data set. This might be followed by additional data enhancement 260 of the stacked or unstacked seismic data and/or attribute generation (step 270) therefrom. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

Preferred Embodiments

According to a first preferred aspect of the instant invention, there is provided a system and method for extending zero-offset or stacked wave-equation illumination analysis into the angle-gather domain, where it becomes an appropriate tool for assessing the effects of complex overburden on AVA response. A preferred method for doing this involves first creating an angle gather that has a perfect AVA response (i.e., a response where the reflected seismic events have a constant amplitude as a function of angle of incidence with respect to the subsurface layers). This "perfect" gather will then preferably be used as a reflectivity map in a demigration or modeling process which creates modeled data that, by construction, carries with it a completely flat AVA response. Remigration of such a data set will then result in a gather on which any amplitude variation is more likely to be a measure of illumination effects alone. The resulting AVA signature on the gather can then be used to assess the validity of the AVA response on modeled or actual data, resulting in a useful AVA risk analysis.

By way of general background, the amount of seismic energy that is reflected from a subsurface reflector at a sub-critical angle varies depending (at least in part) on its angle of incidence with respect to the reflector. Further, the magnitude of this effect is much more pronounced at the interface between a formation that contains gas and another that does not. This effect has made it possible to use AVA techniques to estimate subsurface elastic parameters from seismic data. Thus, it is customary to include this effect in synthetic seismic traces that are produced by conventional modeling programs. However, it should be noted that the instant method specifically excludes such computations in the formation of its modeled seismic traces.

The preferred embodiment of the instant invention may be generally understood as follows. Assume that the observed seismic data may be represented by the familiar conceptual equation Seismic Data=forward propagation*reflectivity, or $D=FR$.

Conceptually, the operator F represents all the effects of actual propagation through the earth. In the common practice of imaging of seismic data, this operator cannot be found directly, and is instead approximated with a simpler modeling operator M so that $D \sim MR$.

It is common to then make a second approximation to obtain a seismic image. Because the operator M cannot be easily inverted, the seismic image is often obtained by applying the adjoint M* of the operator M instead of its inverse. Those of ordinary skill in the art will recognize that the "adjoint" of a square matrix is defined to be its conjugate transpose. In general, the process of migration may be thought of as the process of applying the adjoint operator M* to the seismic data.

Given the foregoing, the process of migration to obtain an image of the subsurface reflectivity may be written as:

$I=M^*D$

In order to improve on this approximation, one approach would be to treat the problem as a least squares problem instead of using the operator M* to migrate the data. Using this approach, an improved migration will be obtained:

$I=(M^*M)^{-1}M^*D$

Thus, what is needed is a means for computing the inverse of M*M. The inverse of M*M contains combined information about illumination at all dips and opening angles as well as migration resolution and amplitude fidelity. Additionally, if augmented with the acquisition geometry, it contains information regarding the acquisition footprint.

The quantity M*M contains information related to three aspects of recorded seismic data, i.e., illumination, imaging amplitude fidelity, and acquisition footprint. However, for simplicity the term "illumination information" will be used herein to refer to all three types of information. Note that, even if the operator (M*M) were known in its entirety, calculating its inverse would be expensive in terms of computational resources and, thus, disfavored in most instances.

M will be referred to herein as a demigration operator, since M* represents a migration operator. A brute force approach to finding (M*M) is a difficult one since the matrices involved are a quite large (e.g. nxm*nym*nh*nt*nx*ny*nz elements where nxm is the number of trace midpoint locations in the x direction, nym is the number of trace locations in the y direction, nh is the number of offsets in a narrow azimuth geometry, nt is the number of time samples, and (nx, ny, nz) are the dimensions of the reflectivity model).

As a consequence, the following techniques will preferably be employed to implement the instant method.

An approximation to (M*M) may be obtained by applying this operator to appropriate unit-amplitude subsets of the reflectivity model. The illumination footprint information obtained in this way depends on the nature of the data set used. The end product is obtained from the demigrated/remigrated data set is an opening-angle gather, obtained either directly from the migration process, or via slant stacking in the case of a migration process that outputs subsurface-offset gathers. An alternative product is a surface-offset gather for in the case of a migration that outputs surface offset gathers. Those of ordinary skill in the art will recognize that a "slant stack" (radon transform, tau-p transform, etc.) is a method of seismic plane wave decomposition. It can be calculated by applying a series of linear moveouts to an unstacked seismic gather and summing each moveout over offset. Of course, there are more computationally efficient means of calculating the slant stack than the brute-force shift/sum and those of ordinary skill in the art will be familiar with same.

By way of explanation, suppose a single sample of unit amplitude representing a point diffractor is placed at some location (x, y, z, h) in the reflectivity model as a function of the three spatial (x, y, z) and one subsurface offset (h) dimension, and is then demigrated and remigrated (i.e., the operator (M*M) is applied). By using this approach, illumination information is obtained for all dips and opening angles, since the slant-stack of a point diffractor in all dimensions (x, y, z, h) generates the dip and opening angle components of the point diffractor.

In the preferred embodiment, a method of AVA confidence mapping is taught. According to this embodiment, illumination information as a function of opening angle is obtained by extending the point diffractor discussed previously to form a surface embedded in the (xyz) reflectivity volume. So, if, for example, the point diffractor is replaced with a planar surface of a given inline and crossline dip, but remains a point diffractor located at zero offset in the subsurface offset direction, the effect of extending the object into a plane in (x, y, z) amounts to the selection of illumination information for a single slant-stack component, or a single dip, in (x, y, z) reflectivity space. Since the input data set is still a point diffractor in the subsurface offset direction, however, illumination for all opening angles are retained. If this planar surface is now deformed to follow geologic structure, it follows that the illumination information derived will be opening angle illumination information specific to the actual geologic structure. In another preferred embodiment, density reflectors of appropriate amplitude are placed in the subsurface in a density model to be used in two-way acoustic or elastic modeling. Forward modeling is then performed, and the resulting data is then migrated to form angle gathers, either directly, or via slant stacking as indicated above.

Figure 6A:
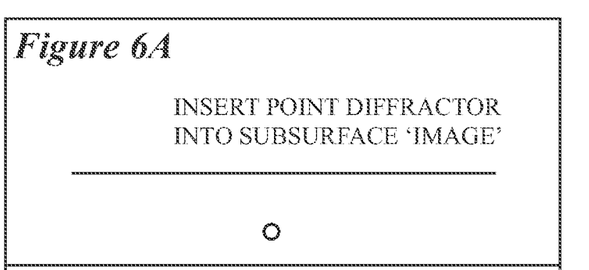
FIGS. 6A-6C contain a schematic representation of the migration/demigration/modeling process of the instant invention.
Figure 6B:
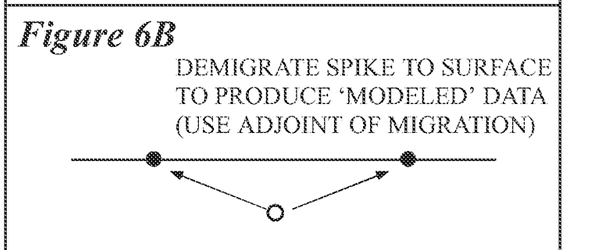
Figure 6C:
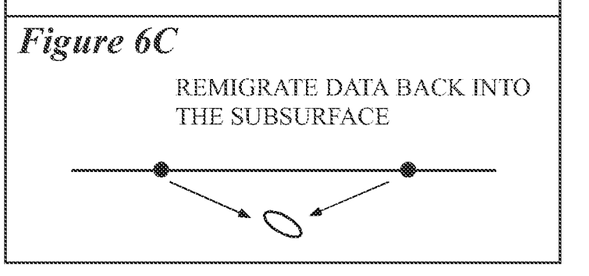

As is generally suggested in FIGS. 6A, 6B, and 6C, the instant invention preferably begins by creating a subsurface reflectivity or density/velocity model. As described in the previous section, a reflectivity or density surface that follows the interpreted structure will preferably be created in (x, y, z) space The model will then be demigrated, or forward modeling will be applied to the model to generated modeled data (FIG. 6B) according to methods well known to those of ordinary skill in the art and then remigrated into the subsurface (FIG. 6C) to form an angle gather. This data set results in illumination information as a function of opening angle. The information used in the demigration or modeling process corresponds to a "perfect" angle gather, e.g. a gather with no amplitude imprint as a function of opening angle (i.e., angle of incidence). After remigration, the resulting amplitude imprint on the angle gather will thus be a function of varying illumination due to propagation through complex structure, the amplitude treatment of the migration algorithm itself, and the acquisition footprint.

The preferred embodiment described above is appropriate for those migration processes that naturally produce subsurface offset gathers, such as wave equation migration, or migrations which produce angle gathers directly For other imaging algorithms such as Kirchhoff migration, the preferred output is a gather in which each surface vector offset range is imaged independently, resulting in a gather whose traces represent independent images from each vector offset, or an "offset" as opposed to an "angle" gather. For this type of imaging process, the input reflectivity will preferably be chosen to be the geologic surface of unit amplitude in (xyz) reflectivity space. The preferred embodiment of the invention is to then demigrate and remigrate this input reflectivity to each vector offset independently. Amplitude variation across the resulting gather is then a direct indication of illumination variation. Note that in the case of forward data modeled from density reflectors, the migrated data output may take the form of a surface-offset gather. The surface offset gather containing the illumination information may then be converted to an opening angle gather using standard surface offset to subsurface angle techniques.

These concepts may be extended to an AVA analysis of the illumination imprint as follows:

Select a subsurface event.

Create a perfect synthetic gather. For migration processes for which the natural gather output is subsurface offset, the perfect gather is a geologic surface of unit amplitude embedded in (x, y, z, h) reflectivity space, with a spike located at zero subsurface offset (h). A slant stack of such a gather contains no amplitude variation as a function of angle of incidence. In the case of forward modeling, a reflection experiment containing no variation in amplitude as a function of opening angle can be created by inserting horizons of some appropriate density amplitude. Those of ordinary skill in the art will understand how to create such models. For migration processes for which the natural output gather is vector surface offset, the perfect gather is the geologic surface of unit amplitude embedded in (x, y, z) reflectivity space, duplicated for all surface vector offsets.

Demigrate the perfect gather or carry out the forward modeling, and then remigrate the resulting data back to the reflectivity volume. This perfect gather now has all of the effects of wave propagation, uneven illumination, acquisition geometry, etc., contained within it. For purposes of the instant disclosure, such "perfect" synthetic seismic data set will be referred to herein as a calibrating seismic data set.

Perform AVO/AVA amplitude analysis on this new calibrating gather to obtain the AVO/AVA amplitude imprint of the illumination, and use the results to "renormalize" amplitudes on the actual seismic gather.

According to the preferred embodiment a one-way wave-equation demigration to model the data or, alternatively, a two-way modeling of a suitable subsurface model will be used. Hence, it is useful to contrast this approach with other modeling options that are conventionally available. Table 1 contains such a comparison.

TABLE 1

Illumination modeling options.

| | Speed | Accuracy in Salt | Multiples | Model Complexity | Angle reflectivity signature control |
|---|---|---|---|---|---|
| Ray Tracing | ++ | − | No | Simple | Yes |
| "Beam" | ++ | − | No | Simple | Yes |
| Acoustic Finite Difference ("FD") 1 way | + | + | No | Simple | Yes |
| Acoustic FD 1 way variable density | + | + | No | Moderate | Yes |
| Acoustic FD 2 way variable density | − | + | Yes | Moderate | Via parameters |
| Elastic FD 1 way | − | + | No | Complex | Via parameters |
| Elastic FD 2 way | −− | + | Yes | Complex | Via parameters |

The first column of the matrix indicates in a general way (from "++"/relatively fast to "−−"/relatively slow) the relative computational speed of the associated algorithm. The second column indicates generally how accurate the associated algorithm is in the presence of a subsurface velocity anomaly such as a salt body, with "−" indicating "relatively inaccurate." The "Multiples" column indicates whether the associated algorithm can accommodate multiples. The next column (i.e., "Model Complexity") indicates how complex the input subsurface velocity model can realistically be.

Finally, the last column indicates what control (if any) the user of the associated algorithm has over the angle-versus-amplitude signature that is inherent to a particular modeling method. In most two-way time modeling methods, the AVA signature is inherent in the process, and is controlled by the model parameters. In these methods reflections are created as a direct result of applying differencing operators in space and time. This is not the case for methods that are based on Born or Kirchhoff scattering. Here the user has control over the inherent AVA signature of the modeling method, which is describe in further detail hereinafter. A key aspect of the preferred modeling approach is that it is possible to avoid mixing the illumination AVA effect with the inherent AVA characteristics at the reflector due to rock physics or hydrocarbons. That being said, any of the aforementioned techniques might be prove to be useful in a particular situation and the previous table is intended to indicate in a general way the advantages and disadvantages of each technique, and is not intended to exclude any particular approach.

Turning next to a detailed discussion of a preferred algorithm, let M be a modeling operator that approximates the forward seismic experiment, for which the collected data is seismic data $\psi(s, r, \omega)$ as a function of source, receiver and frequency.

Migration is typically defined as the adjoint M* of forward modeling in the Born or Kirchhoff approximation. These sorts of migration methods create a reflectivity map $\alpha(x, \theta)$ that is a function of space and opening angle, $\theta$. The first order least-squares correction to imaging is then given by $$\alpha = (M^*M)^{-1}M\psi$$

For purposes of the instant disclosure, an approximation to the operator M*M will be used that provides illumination information for AVA. In what follows the mathematics will be understood to be illustrative only, and details of the derivations that are well known to those skilled in the art will be omitted for purposes of clarity. In the Born approximation, the equation that describes forward scattering can be written schematically as follows:

$$\psi(s,r,\omega) \approx \int dx d\theta S[\alpha(x,\theta)] G(r,r',\omega) G(s,s',\omega)$$

where s' and r' are chosen to be near the reflection point x, $\alpha$ is the angle dependent reflectivity, and S is an operator that converts the angle dependent reflectivity into a matrix operator that scales the contribution to the modeled data at points (s', r') in the reflection process. The adjoint of the modeling equation is the migration equation $$\alpha(x,\theta) \approx S^* \int ds dr G^*(s,s',\omega) \psi(s,r,\theta) G^*(r,r',\omega)$$

The operator S* isolates energy as a function of opening angle, and for one-way wave-equation migration, this is often implemented as a slant-stack operator that converts subsurface offset to opening angle. For those migrations that generate angle gather information directly, the operator S may be omitted.

In a typical inversion process, one would normally try to solve for the angle dependent reflectivity $\alpha$ for which the modeled data matches the actual data. In the instant case, however, only illumination information is sought, which suggests that the reflectivity signature should be eliminated from the model calculation, and, instead, a reflectivity that is independent of angle in the Born modeling equation should be used. Since S* is, in effect, a slant stack in the preferred embodiment it follows that S is an adjoint slant stack. Realizing that the adjoint angle slant stack of a quantity independent of angle gives a delta function at zero subsurface offset, the following prescription for computing the angle-dependent illumination may be obtained.

In brief and according to another preferred embodiment, the instant invention will preferably operate follows:

A seismic survey will be conducted over a subsurface region of interest.

A depth model (structural, stratigraphic, etc.) of the subsurface will preferably be constructed that includes a best guess configuration of the subsurface reflectors and their respective velocities (and densities if available). Velocities, densities, etc., that would correspond to the presence of subsurface hydrocarbons will be excluded from this model, a goal being to determine the AVA/AVO response in the absence of such hydrocarbons. At this stage the model will not need to be overly detailed, but instead will preferably at least reflect the main features of the subsurface.

A unit-amplitude reflector model of the subsurface will preferably be constructed by converting the structural model information into a unit amplitude reflectivity model that follows the interpreted horizons in depth. Alternatively, density reflectors of an appropriate amplitude will be created in a density model to be used in two-way elastic or acoustic forward modeling.

The unit-amplitude reflector model will next preferably be demigrated using a background velocity model and the acquisition geometry Alternatively, forward modeling using the density reflectors will be carried out using two-way acoustic or elastic modeling. This will produce an estimate of the unmigrated seismic data that could have given rise to the artificially constructed reflectors.

Next, the data from the previous step will preferably be migrated (i.e., remigrated). In conjunction with this step, the downward-continued offset (DCO) gathers (using, for example, CAWE (common azimuth wave equation) or shot-record algorithms for NATS (narrow azimuth towed streamer) and WATS (wide azimuth towed streamer)) will preferably be calculated and saved. Note that, preferably, the DCO gathers will have unit amplitude at zero offset and zero amplitude at non-zero offset. This corresponds to flat angle gathers with unit amplitude at all angles. Preferably, the output will take the form of unstacked synthetic seismic gathers which represent seismic that would be expected if the subsurface did not contain hydrocarbons.

Due to illumination, migration, and acquisition effects, however, in practice the output DCO gathers will not be perfect (filtered) spikes, and hence after the slant stacking to obtain angle gathers, the data no longer have constant amplitude as a function of angle. However, these data now represent the best obtainable synthetic seismic data assuming, of course, that the provided velocity model/subsurface model is accurate and the acquisition configuration has been correctly specified.

Next, DCO data will preferably be converted to angle gathers.

Alternatively, in the case of one-way or reverse-time migration where direct angle gather output is possible, the formation of DCO gathers can be skipped, and angle gathers directly output.

On the other hand, in the case of forward modeling from density reflectors, a model containing horizons with suitable density contrasts can be constructed. Forward modeling is then carried out to create synthetic data, which are then migrated to form angle gathers containing illumination information.

The angle gathers produced by the above process provides a baseline against which to compare the observed seismic data. More particularly, to the extent that the seismic data produced according to the method discussed above differ from the observed seismic data, that difference could possibly be attributed to the presence of hydrocarbons in the subsurface since the effects of such will preferably have been excluded from the model. On the other hand, where the synthetic and actual data sets are comparable, that is an indication that the amplitude variations between the model and actual seismic data are not due to hydrocarbons, but instead are most likely due to illumination, migration, or acquisition effects.

Of course, there are other theories that might account for the observed discrepancies (e.g., noise, imperfections in the original subsurface model, absorption, mode conversion, etc.). However, the one known systematic difference between the actual data and the demigrated/migrated data will be the exclusion of hydrocarbon-type reflectivities and velocities from the model data.

Turning next to a discussion of how the instant method might be implemented in practice, as has been indicated previously a model that contains synthetic reflectors which follow the subsurface structure and have zero reflectivity at all offsets except at zero subsurface-offset will preferably be created. Alternatively, a set of density reflectors will be created.

Next and preferably, the reflectivity synthetic model will be demigrated using the Born scattering equation, or, alternatively, the density model will be forward-modeled to create synthetic data. In both cases the data is then remigrated to obtain angle gathers. Since the modeled data has been designed to have an AVA signature that is angle independent, any variation in amplitude on the resulting gather should be due to uneven illumination alone. Those of ordinary skill in the art will recognize that for 3D data, "angle gather" will be understood to include the traditional notion of same as well as angle gathers that are a function of subsurface azimuth, angle gathers obtained by stacking, substacking, or picking over subsurface azimuth, etc.

Based on the foregoing, the preferred algorithmic flow is to start with a filtered unity reflectivity model with dips that mimic in a general way those actually found in the subsurface, or alternatively density reflectors of appropriate amplitude. Preferably, the reflectivity or density model will be one that generally honors the actual subsurface structure as indicated by the seismic data. Methods of creating such models from seismic data, well logs, gravity and magnetic data, etc., are well known to those of ordinary skill in the art.

Through application of the demigration/remigration or forward modeling/migration scheme taught herein, the model/ reference dataset will be subjected to the transmission effects of the (typically) complex overburden represented by the model. Since the resulting data set is multidimensional, it may be useful to display its information using a variety of display schemes including horizontal time slices, vertical cross sections, angle gathers, various pseudo-color enhanced versions of same, etc.

The instant inventors have determined that abrupt dip changes in the subsurface (e.g., rock units near the base of a salt dome), and particularly instances where the base becomes steep relative to the top, have the potential to create significant changes in illumination as a function of angle. This can potentially create blank spots in the angle gathers where no reflected energy is present.

More interesting to an AVA interpreter, however, is the spatial signature of the illumination imprint as a function of opening angle. Often certain angle sub-stacks are better than the full stack, and in the case where azimuth information is available, i.e., certain azimuths may be preferred in different areas. In some cases, it is instructive to examine displays of illumination as a function of opening angle which can preferably be obtained by picking amplitudes along events created by partial stacking of angle gathers and coloring the events according to amplitude. Areas of strong illumination can then be seen in, e.g., white, while areas that have poor illumination will be lower in amplitude and might be assigned to be black in the display. From these sorts of illumination maps, the interpreter can often determine which partial stack has the best interpretability spatially, and which will be most successful in mapping the well. Displaying the variability in subsurface reflector illumination using images such as those described above can provide a basis for an objective discussion concerning which dataset might potentially be the best for mapping a complex structure. In a complex exploration play, the interpreter may be faced with using several different substack volumes in order to completely map around a complex salt structure, and displays such as the forgoing could help select such volumes for incorporation into the active exploration dataset.

After merging the structural interpretation from different volumes, the preferred next step is often the assessment drilling targets based on seismic amplitudes. Those of ordinary skill in the art will recognize that caution must be exercised in using the merged volume for amplitudes however, because amplitudes in the merged volume will at the target level tend to have a heterogeneous angle contribution spatially. In such a case the interpreter would be well advised to exercise caution when analyzing bright spots. For example, in an area where far offset angles have strong illumination compared to the near offsets, amplitudes may be strong on far offsets compared with nears, leading the interpreter to possibly classify the event as a class III AVA anomaly when in fact no such anomaly exists.

By way of explanation, those of ordinary skill in the art will understand that AVA responses are broadly characterized as to type with a Class I AVA response being one where the top of the reservoir is represented by an increase in impedance (i.e., a seismic peak). These sorts of gas sands tend to show "dim-outs" in the stack data. A Class III AVA is one that is characterized by a reflection where the top of the reservoir has a decrease in impedance (trough) as compared with the rock above it. These sorts of reservoirs tend to produce the classic Gulf Coast "bright spots." Finally, a Class II AVA response is one where the top of the reservoir is represented by a peak that decreases in amplitude, changing to a trough at far offsets/angles. On a stacked seismic section, these sorts of gas sands can be almost invisible due to amplitude cancellations caused by summing together the near and far offsets.

In view of the foregoing, the instant inventors believe that it is prudent to devise an AVA assessment workflow that quantitatively analyzes how illumination issues impact a detailed seismic reservoir response. In general, once the illumination data set has been obtained, different methods can be devised that integrate the illumination response with standard reservoir modeling workflows, depending on the seismic analysis objective.

For example, in a preferred embodiment an initial reservoir elastic modeling can be performed to assess the AVA response in the absence of any illumination effects. Since the illumination volume contains only the effects of illumination, these effects can be transferred to the reservoir model response through the use of, for example, a matching filter. The filter will preferably be designed in such a way that its application to a perfect or calibration gather (i.e., one with no AVA signature) reproduces the illumination response. The filter will then be applied to the reservoir-modeled response, thereby transferring the illumination effect to the modeled response. Hence, by having a "perfect"/calibration dataset, and one with detrimental effects from the uneven illumination, match filters can be designed which will locally transfer the illumination degradation to a synthetically created (or real data) dataset of choice. Note that the terms "match filter" or "matching filter" should be understood to be one or more 1-D, 2-D, 3-D, etc., filters and should not be limited in interpretation to being a single 1-D filter that is applied to the entire data set.

From this sort of information it is now possible indicate regions (e.g., polygons) within which an AVO inversion is expected to accurately reflect lithology or fluid content. Knowing this will make it possible to better determine those areas where the oil filled reservoir looks no different than the brine filled reservoir. Furthermore, with these sorts of illumination filters according to the instant invention being readily available, different reservoir geometries can be tested and investigated to determine how non-unique the assessment and pay distribution are for a given salt geometry.

A similar approach is also applicable to synthetic data created directly from a reservoir model For example, suppose that a class III AVO behavior is observed on the original reservoir modeled data. Once the illumination filters have been applied, it is possible that a class III AVO might be degraded or eliminated. Obviously, if such is observed the trustworthiness of the observed seismic response might be questioned. In brief, where there is good seismic illumination of a rock unit in the subsurface, the confidence in the seismic data, and calculations made therefrom (e.g., AVO/AVA) will be higher as compared with rock units with lesser degrees of illumination. Of course, where confidence in the calculations is higher, the explorationist will be more inclined to place credence in and reliance on the results.

Figure 3:
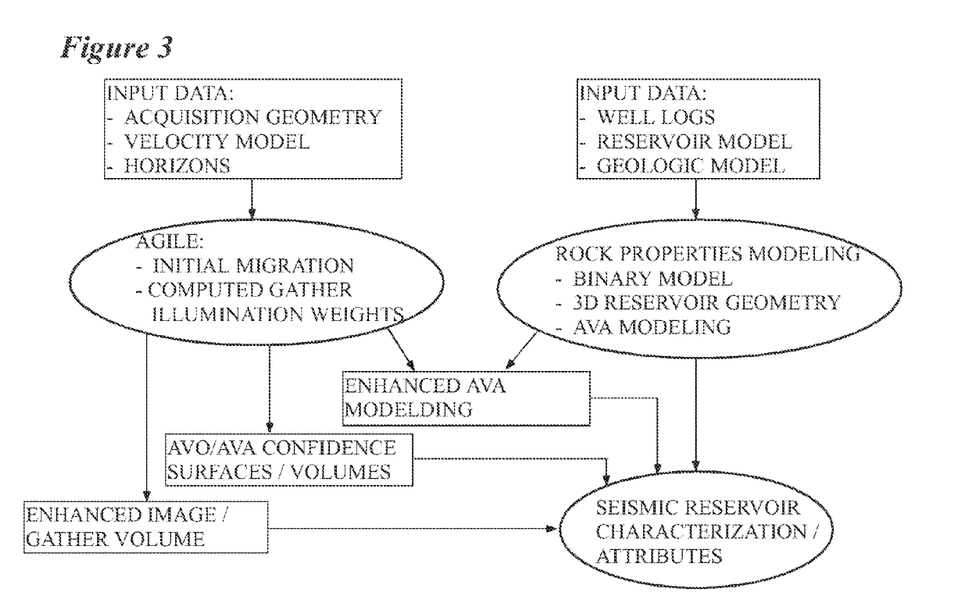
FIG. 3 contains a schematic illustration of how the instant invention might be used in an exploration setting.

Turning next to FIG. 3, this figure illustrates some of the many ways that the instant invention (i.e., "angle gather illumination evaluation" or "AGILE" in this figure) might be utilized in an exploration setting. Generally speaking, and as is indicated in this figure, data that are suitable for input into and/or use with the instant invention might take one of two forms. In a first case, data such as the seismic survey acquisition geometry, a (simple or complex) velocity model of the subsurface, key horizon picks/depths, etc., will preferably be used as input to the instant invention. The output could include, for example, illumination weights that could be further used in enhanced AVA modeling, AVO/AVA confidence surface/volume, enhanced images/gather volumes from field data. All of this sort of information could then be useful in, for example, creating a seismic characterization of a reservoir, looking for seismic attributes that are associated with or predictive of a reservoir, etc.

Additionally, and as a second general source of data, the instant invention might utilize information from well logs that have been taken in wells that are proximate to the survey. Additionally, reservoir and geologic models might be used to create binary models, specify the 3D reservoir geometry, and/or create AVA models. AVA models created from well logs could then be compared with enhanced AVA models obtained via the instant invention (e.g., where the effects of illumination have been accounted for) to determine (among other things) the level of confidence in the AVA estimates that have been calculated from the field data. Again, all of this sort of information will likely prove to be useful in characterizing and predicting reservoir occurrence and extent, etc.

Figure 4:
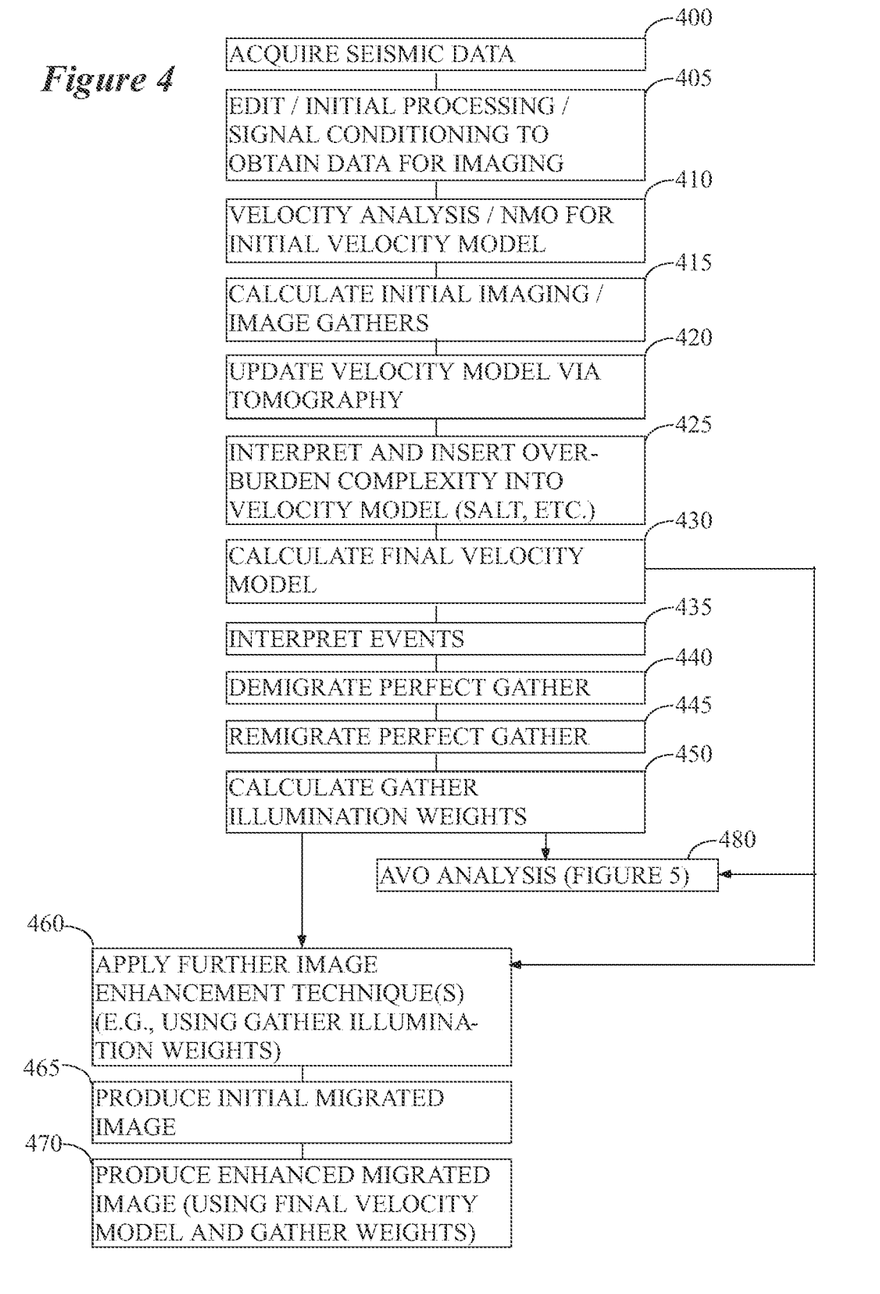
FIG. 4 a preferred operating logic suitable for use with the instant invention.

Turning next to FIG. 4, this figure contains a preferred operating logic that would suitable for use with the instant invention. As a first step 400, preferably seismic data will be acquired over a subsurface target of interest. Next, and preferably, the raw data will be edited, subjected to initial processing (e.g., geometry specification, filtering, etc.), which processes are designed to place the data in condition for use in imaging.

As a next preferred step, the explorationist will conduct a velocity analysis (either automated or manual) and construct an initial velocity model (step 410) according to any number of methods well known to those of ordinary skill in the art.

As a next preferred step 450, the data will be further processed for purposes of imaging, which processing might include deconvolution, multiple removal, etc.

Next, and preferably, the instant invention will continue by updating the velocity model using, for example, seismic tomography or some other velocity estimation method (step 420).

Next, the instant invention will preferably continue by inserting additional overburdened complexity into the velocity model (step 425). Since the initial model might be relatively simple (e.g., a flat or "layer cake" model), it is usually desirable to modify it to more accurately reflect the true subsurface layer configuration. Obviously, the more accurate the overburden model the more reliable the modeling results will be. In the case of the overburden model, such additional information might come from the tomographic analysis (step 420) mentioned previously or from well logs, VSP surveys, the seismic data itself, etc.

As an example of the sort of updating that is contemplated in step 425, where a salt dome (or other structure) is expected or known to be present beneath the seismic survey area, velocities that are typical of that sort of structure might be added to the initial velocity model, with the idea that the additional complexity will at least roughly mimic that found in the subsurface under the survey. Note that it is expected that this step might take place where there is limited knowledge of the actual configuration and extent of the salt dome or other structure. Thus, additional refinements may be necessary or desirable.

As a next preferred step 430, the instant invention will obtain a final velocity model, preferably by refining the updated model from the previous step.

Next, the instant invention will preferably continue by having the explorationist supply an interpretation of the events on the migrated section. The purpose of this is to obtain information that can be used to further refine the velocity model in preparation for step 440 which is the demigration of a perfect/calibration gather, or alternatively modeling of synthetic data Next, and preferably, the instant invention will continue by remigrating the demigrated gather (step 445).

As a next preferred step, the gather weights will be calculated (step 450). Preferably these weights will be based on the amount of seismic energy that illuminates the subsurface reflectors that are recorded within a trace. Said another way, the amplitudes within traces produced by the demigration/modeling/migration of the subsurface model will tend to have larger values where a reflector is well imaged and smaller (or zero) values where there is less reflected seismic energy. This suggests that seismic traces in the original survey might be weighted according to the energy contained in the demigrated/modeled/migrated model data as such energy represents the amount of illumination to which the model trace was exposed.

Next, depending on the desires of the explorationist, the instant invention might continue along two different lines. In some instances, an AVO analysis will be performed (step 480), as is indicated in greater detail in FIG. 5.

In other preferred embodiments, invention enhancement 460 will be further performed and an initial migrated image prepared (step 465).

In some preferred embodiments, an enhanced migrated image will be prepared using the final velocity model and the gather weights calculated from step 450 (step 470). Of course, the enhanced image would then be usable in the search for subsurface resources according to methods well known to those of ordinary skill in the art.

Figure 5:
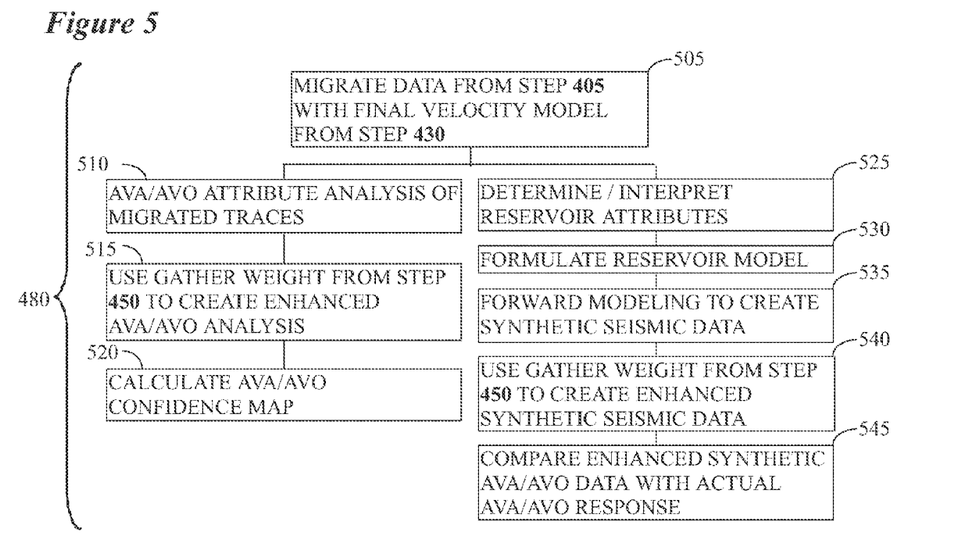
FIG. 5 a continuation of the preferred operating logic from FIG. 4 with additional details regarding the back projection loop.

FIG. 5 contains additional details of a preferred embodiment of step 480 from FIG. 4. As a first step, the data from step 405 will preferably be migrated with a final velocity model of the sort obtained from step 430. Of course, the migrated data are useful without further processing at this point and the data from step 505 might be used in any number of ways. The steps that follow it in FIG. 5 are intended to be examples rather than limitations of the uses to which this invention might be applied.

Steps 510, 515, 520 (i.e., the left branch) illustrate how data processed by the instant invention might be used in the form of a conventional AVA/AVO analysis (step 510), in which weights from step 450 could be used to create an enhanced AVA/AVO analysis (step 515) and calculation of an AVA/AVO confidence map (step 520). Generally speaking, steps 510-520 would be most often used in exploration.

On the other hand, steps 525-545 contain applications of the instant invention which would be more suitable when a specific reservoir or other target has been selected. For example, steps 525-535 are concerned with using data that have been processed according to the instant invention in the determination of the reservoir attributes, formulation of a reservoir model, and forward modeling of that reservoir model to create synthetic seismic data. These steps are, of course, old and well known in the art. However, step 540 utilizes the gather weights from step 450 to create enhanced synthetic seismic data sets and step 545 might come into play when the explorationist compares the enhanced synthetic AVA/AVO data with the actual subsurface response as measured by the seismic data.

It would be prudent in some instances to devise an AVA assessment workflow that quantitatively analyzes how illumination issues impact a detailed seismic reservoir response. In general, once the illumination data set has been obtained, different approaches can be utilized to integrate the illumination response with standard reservoir modeling workflows, depending on the seismic analysis objective.

For example, in some preferred embodiments a detrimental matching filter might be obtained from the illumination data with the intent that such will be applied to a detailed reservoir response. In this workflow, an initial reservoir model might be created to assess the AVA response in the absence of any illumination effects. Since the illumination volume contains only the effects of illumination, these effects can be transferred to the reservoir model response through the use of a matching filter. The filter would be designed in such a way that its application to a calibration gather such as that taught herein (i.e., with no AVA signature) would reproduce the illumination response. The filter would then be applied to the reservoir-modeled response, thereby transferring the illumination effect to the modeled response. Hence, by having a "perfect"/calibration dataset (i.e., one with no AVA signature), and one with detrimental effects from the uneven illumination, it would be possible to design match filters which would locally transfer the illumination degradation to the user's choice of synthetically created dataset.

CONCLUSIONS

The instant disclosure has presented a method for assessing illumination effects as a function of opening angle beneath complex overburden. Through the use of match filters, these illumination effects can be transferred to modeled AVA responses, leading to an effective method for assessing the affects of illumination on AVA, and the associated risk in well mapping and placement.

Although the term "unit amplitude" model (i.e., one that has unit amplitude reflectivity at all angles) has been used repeatedly herein to characterize the seismic model that is used to calculate illumination weights, those of ordinary skill in the art will recognize that all of the model amplitudes need not be equal to unity, although that might conventionally be done. In generally, a "unit amplitude" model should be broadly understood to be an "equal amplitude" model, where the reflection amplitudes at all angles are all at least approximately equal and might be unity or some other constant value depending on the desires and needs of the processor or programmer. Further, those of ordinary skill in the art will recognize that a unit amplitude reflectivity model can be constructed in many ways Additionally it should be noted that a key aspect of the instant invention is the use of a calibration seismic dataset to normalize actual seismic data to correct for imperfections in illumination so that a subsequent AVA analysis is more reliable. In the preferred embodiment the calibration data set will be obtained by migration/demigration of a unit amplitude model or by insertion of density reflectors into a seismic model. That being said, what is important is the creation of a synthetic data set which has illumination effects but no AVO effects, however that data set might be calculated.

Note that when the term "AVA" is used herein, that term should be broadly construed to also include "AVO" analyses, although typically the latter is often regarded as a subset of the former.

Output from the instant invention might be used to created enhanced image or gather volumes, calculate AVO/AVA confidence surfaces or volumes, perform enhanced AVA modeling (preferably using input from the rock properties modeling module), etc.

Finally, any or all of the foregoing might be used to characterize the seismic expression of the target reservoir. Seismic attributes calculated from the reservoir model could then be sought for and identified in the actual seismic data as a means of mapping the extent of the reservoir and/or determining the presence or absence of hydrocarbons.

Although the invention disclosed herein was discussed almost exclusively in terms of seismic traces that can be organized into shot, receiver, or "CMP" gathers, that was done for purposes of specificity only and not out of any intent to limit the instant invention to operation on only that sort of seismic data. So, within the text of this disclosure, the terms seismic trace and CMP gather are used in the broadest possible sense of those terms, and they are meant to apply to conventional 2D and 3D traces and CMP gathers, as well as to other sorts of gathers which might include, without limitation, CRP gathers, CCP gathers (i.e., "common conversion point" gathers), CACP ("common asymptotic conversion point") gathers, common offset gathers, common shot/receiver gathers, etc, the most important aspect of a "gather" being that it represents an organized collection of unstacked seismic traces from either a 2D or 3D survey all of which have at least one subsurface image point in common. Note that the term migration is used in its broadest sense consistent with the aims of the instant invention, which might include time or depth Kirchhoff migration, beam migration, one-way migrations, or two-way acoustic or elastic migration, with any variation of extrapolated data, including point source, line-source, or plane wave extrapolations.

As was mentioned previously, a typical seismic surveys may be thought of as consisting of five dimensions, i.e., time (or z), x, y, shot-receiver offset in x, and shot-receiver offset in y. This method taught herein can easily be extended from two dimensions into three, four, five, six, or even more dimensions by those of ordinary skill in the art (e.g., a 6D survey is a prestack time-lapse 3D survey). Using more dimensions typically allows a more accurate and robust method of interpolation, although the computation cost tends to increase with dimensionality.

Further, in the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons. By way of example only, the same approach described herein could potentially be used to process and/or analyze multi-component seismic data, shear wave data, converted mode data, cross well survey data, full waveform sonic logs, controlled source or other electromagnetic data (CSEM, t-CSEM, etc.), or model-based digital simulations of any of the foregoing. Additionally, the methods claimed herein after can be applied to mathematically transformed versions of these same data traces including, for example: filtered data traces, migrated data traces, frequency domain Fourier transformed data traces; transformations by discrete orthonormal transforms; instantaneous phase data traces, instantaneous frequency data traces, quadrature traces, analytic traces; etc. In short, the process disclosed herein can potentially be applied to a wide variety of types of geophysical time series, but it is preferably applied to a collection of spatially related time series. Thus, when the term "seismic trace" or "trace" is used herein, those terms should be broadly construed to include traditional seismic traces as well as any of the foregoing.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of exploration for hydrocarbons within a predetermined volume of the earth containing structural and stratigraphic features conducive to the generation, migration, accumulation, or presence of said hydrocarbons, comprising the steps of:
    a. accessing a digital representation of a seismic survey that images at least a portion of the predetermined volume of the earth;
    b. creating a subsurface model that is representative of at least a portion of the predetermined volume of the earth;
    c. using at least said subsurface model to create a calibration seismic data set, said calibration seismic data set being formed from a seismic modeling program that, based on modeled data comprising a flat reflectivity signature, produces data comprising amplitude variations indicative of illumination effects;
    d. using at least a portion of said calibration seismic data set to normalize at least a portion of said digital representation of said seismic survey;
    e. conducting, by a processor, an AVA analysis using at least a portion of said normalized portion of said digital representation of said seismic survey; and,
    f. using said AVA analysis to explore for hydrocarbons with the predetermined volume of the earth.

2. The method according to claim 1, wherein step (c) comprises the steps of;
    (c1) forming a unit amplitude reflectivity subsurface model of at least a portion of the predetermined volume of the earth,
    (c2) obtaining an acquisition geometry,
    (c3) using at least said acquisition geometry to demigrate at least a portion of said unit amplitude reflectivity subsurface model, thereby obtaining a demigrated seismic data set, and,
    (c4) migrating said demigrated seismic data set, thereby obtaining a calibration seismic data set.

3. The method according to claim 1, wherein step (c) comprises the steps of;
    (c1) forming a density subsurface reflectivity model of at least a portion of the predetermined volume of the earth,
    (c2) obtaining an acquisition geometry, (c3) using at least said acquisition geometry to forward model at least a portion of said density subsurface model, thereby obtaining a demigrated seismic data set, and, (c4) migrating said demigrated seismic data set, thereby obtaining a calibration seismic data set.

4. A method of exploration for hydrocarbons within a predetermined volume of the earth containing structural and stratigraphic features conducive to the generation, migration, accumulation, or presence of said hydrocarbons, comprising the steps of:

a. accessing a digital representation of a seismic survey that images at least a portion of said predetermined volume of the earth;

b. forming a unit amplitude reflectivity subsurface model of at least a portion of the predetermined volume of the earth;

c. obtaining an acquisition geometry;

d. demigrating, by a processor, said reflectivity data set using at least said unit amplitude subsurface reflectivity model and said acquisition geometry to produce a modeled data set;

e. remigrating said modeled data set, thereby obtaining a synthetic seismic dataset exhibiting an illumination effect without effects due to changing angle of incidence; and, f. using said synthetic seismic dataset together with at least a portion of said digital representation of a seismic survey to explore for hydrocarbons within said predetermined volume of the earth.

5. A method of exploration for hydrocarbons within a predetermined volume of the earth according to claim 4, wherein step (f) comprises the steps of:

(f1) using said synthetic seismic dataset to normalize at least a portion of said digital representation of a seismic survey, thereby producing a normalized representation of said seismic survey, and (f2) using said normalized representation of said seismic survey to explore for hydrocarbons within said predetermined volume of the earth.

6. A method of exploration for hydrocarbons within a predetermined volume of the earth containing structural and stratigraphic features conducive to the generation, migration, accumulation, or presence of said hydrocarbons, comprising the steps of:

a. accessing a digital representation of a seismic survey that images at least a portion of the predetermined volume of the earth;

b. creating a subsurface model that is at least approximately representative of the predetermined volume of the earth;

c. using at least said subsurface model to create a calibration seismic data set, said calibration seismic data set being formed from a seismic modeling program that comprises an illumination modeling calculation based on modeled data comprising a flat reflectivity signature;

d. using at least a portion of said calibration seismic data set to normalize at least a portion of said digital representation of said seismic survey;

e. conducting, by a processor, an AVA analysis using at least a portion of said normalized portion of said digital representation of said seismic survey; and, f. using said AVA analysis to explore for hydrocarbons with the predetermined volume of the earth.

7. A method of exploration for hydrocarbons within a predetermined volume of the earth containing structural and stratigraphic features conducive to the generation, migration, accumulation, or presence of said hydrocarbons, comprising the steps of:

a. accessing a digital representation of a seismic survey that images at least a portion of said predetermined volume of the earth;

b. forming a density subsurface model of at least a portion of the predetermined volume of the earth;

c. obtaining an acquisition geometry;

d. using at least said acquisition geometry to forward model through said density subsurface model to produce a modeled data set;

e. remigrating, by a processor, said modeled data set, thereby obtaining a synthetic seismic dataset exhibiting an illumination effect without effects due to changing angle of incidence; and, f. using said synthetic seismic dataset together with at least a portion of said digital representation of a seismic survey to explore for hydrocarbons within said predetermined volume of the earth.

* * * * *